United States Patent
Patel (10) Patent No.: US 10,907,818 B2
(45) Date of Patent: Feb. 2, 2021

(54) ILLUMINATED VANITY MIRROR ASSEMBLY

(71) Applicant: Hubbell Incorporated, Shelton, CT (US)

(72) Inventor: Dhavalkumar Prabhudas Patel, Greer, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/970,040

(22) Filed: May 3, 2018

(65) Prior Publication Data

US 2018/0320886 A1    Nov. 8, 2018

Related U.S. Application Data

(60) Provisional application No. 62/595,730, filed on Dec. 7, 2017, provisional application No. 62/547,150, filed
(Continued)

(51) Int. Cl.
*A45C 15/06* (2006.01)
*F21V 33/00* (2006.01)
(Continued)

(52) U.S. Cl.
CPC ............ *F21V 33/004* (2013.01); *A45D 33/32* (2013.01); *A45D 42/10* (2013.01); *A45D 42/16* (2013.01);
(Continued)

(58) Field of Classification Search
CPC ... F21V 33/004; F21V 33/0004; A45D 42/10; A45D 33/32; F21Y 2115/10; F21W 2131/302
(Continued)

(56) References Cited

U.S. PATENT DOCUMENTS 7,048,406 B1    5/2006 Shih
D536,881 S    2/2007 Mischel
(Continued)

FOREIGN PATENT DOCUMENTS

GB    2419091 A  *  4/2006  ............... A47G 1/02

OTHER PUBLICATIONS

PCT International Search Report and Written Opinion for corresponding PCT Application No. PCT/US2018/045100, dated Oct. 4, 2018, 8 pages.

*Primary Examiner* — William J Carter
*Assistant Examiner* — Omar Rojas Cadima
(74) *Attorney, Agent, or Firm* — Michael Best & Friedrich, LLP (57) ABSTRACT

Illuminated vanity mirror assemblies are disclosed. In one example implementation, an illuminated vanity mirror assembly includes a front panel having a front face and a rear face. The front face can include a reflective surface. The illuminated vanity mirror can include a mirror housing and at least one light source positioned within the mirror housing. The illuminated vanity mirror can include a first mount attached to the rear face of the front panel at or adjacent to the first edge of the rear face of the front panel. The first mount can have a downward facing lip. The mirror housing can define a cavity configured to receive at least a portion of the downward facing lip.

20 Claims, 11 Drawing Sheets

Related U.S. Application Data on Aug. 18, 2017, provisional application No. 62/545,602, filed on Aug. 15, 2017, provisional application No. 62/502,135, filed on May 5, 2017.

(51) Int. Cl.

| | |
|---|---|
| *F21V 7/10* | (2006.01) |
| *A45D 33/32* | (2006.01) |
| *G02B 5/08* | (2006.01) |
| *A45D 42/10* | (2006.01) |
| *A45D 42/16* | (2006.01) |
| *F21Y 115/10* | (2016.01) |
| *F21W 131/302* | (2006.01) |

(52) U.S. Cl.
CPC ................. *F21V 7/10* (2013.01); *G02B 5/08* (2013.01); *F21W 2131/302* (2013.01); *F21Y 2115/10* (2016.08)

(58) Field of Classification Search
USPC ..................................... 362/135–136, 311.11
See application file for complete search history.

(56) References Cited

U.S. PATENT DOCUMENTS

| | | |
|---|---|---|
| D544,219 S | 6/2007 | Mischel |
| D545,067 S | 6/2007 | Mischel |
| D545,574 S | 7/2007 | Mischel |
| D545,575 S | 7/2007 | Mischel |
| D546,073 S | 7/2007 | Mischel |
| D546,566 S | 7/2007 | Mischel |
| D547,071 S | 7/2007 | Mischel |
| D547,072 S | 7/2007 | Mischel |
| D547,073 S | 7/2007 | Mischel |
| D552,358 S | 10/2007 | Mischel |
| D552,359 S | 10/2007 | Mischel |
| D552,360 S | 10/2007 | Mischel |
| D559,553 S | 1/2008 | Mischel |
| D559,555 S | 1/2008 | Mischel |
| D559,557 S | 1/2008 | Mischel |
| D559,558 S | 1/2008 | Mischel |
| D579,671 S | 11/2008 | Mischel |
| D591,054 S | 4/2009 | Erickson |
| D595,511 S | 7/2009 | Mischel |
| D620,718 S | 8/2010 | Mischel |
| 7,853,414 B2 | 12/2010 | Mischel |
| 8,162,502 B1 | 4/2012 | Zadro |
| D689,701 S | 9/2013 | Mischel |
| D704,938 S | 5/2014 | Mischel |
| D704,939 S | 5/2014 | Mischel |
| 2007/0159316 A1 | 7/2007 | Mischel |
| 2008/0212218 A1 | 9/2008 | Mischel |
| 2009/0231836 A1 | 9/2009 | Mischel |
| 2009/0257140 A1* | 10/2009 | Mischel, Jr. .............. G09F 9/00 359/871 |
| 2011/0283577 A1 | 11/2011 | Cornelissen |
| 2014/0016353 A1 | 1/2014 | Chang |
| 2014/0066048 A1 | 3/2014 | Swedenburg |
| 2016/0070085 A1 | 3/2016 | Mischel |
| 2016/0327787 A1 | 11/2016 | Mischel |
| 2016/0341415 A1 | 11/2016 | Seura |
| 2018/0003971 A1 | 1/2018 | Mischel |

* cited by examiner

ILLUMINATED VANITY MIRROR ASSEMBLY

REFERENCE TO RELATED APPLICATION

This application claims priority to U.S. Provisional Application No. 62/502,135, filed on May 5, 2017, titled "ILLUMINATED MIRROR," which is incorporated herein by reference. This application claims priority to U.S. Provisional Application No. 62/545,602, filed on Aug. 15, 2017, titled "ILLUMINATED VANITY MIRROR ASSEMBLY," which is incorporated herein by reference. This application claims priority to U.S. Provisional Application No. 62/547,150, filed on Aug. 18, 2017, titled "ILLUMINATED VANITY MIRROR ASSEMBLY," which is incorporated herein by reference. This application claims priority to U.S. Provisional Application No. 62/595,730, filed on Dec. 7, 2017, titled "ILLUMINATED VANITY MIRROR ASSEMBLY," which is incorporated herein by reference.

FIELD

The present subject matter relates generally to illuminated vanity mirrors.

BACKGROUND

Illuminated vanity mirrors are increasingly popular items as they provide aesthetically pleasing mirrors and can provide improved lighting when looking into a mirror. Illuminated vanity mirrors can include light sources mounted within an assembly used to secure the illuminated vanity mirror to a surface, such as a wall or other surface. It can be challenging to mount an illuminated vanity mirror while still optimizing the lighting from the illuminated vanity mirror. For instance, components within the mirror housing may interfere with lighting from light sources within the illuminated vanity mirror.

BRIEF DESCRIPTION

Aspects and advantages of the disclosure will be set forth in part in the following description, or may be learned from the description, or may be learned through practice of the disclosure.

One example aspect of the present disclosure is directed to an illuminated vanity mirror assembly. The illuminated vanity mirror assembly can include a front panel having a front face and a rear face. The front face can include a reflective surface. The illuminated vanity mirror can include a mirror housing and at least one light source positioned within the mirror housing. The illuminated vanity mirror can include a first mount attached to the rear face of the front panel at or adjacent to a first edge of the rear face of the front panel. The first mount can have a downward facing lip. The mirror housing can define a cavity configured to receive at least a portion of the downward facing lip.

Another example aspect of the present disclosure is directed to a mount for securing a front panel of an illuminated vanity mirror to a mirror housing configured to secure the illuminated vanity mirror to a surface and house one or more lighting sources configured to provide light through at least a portion of the front panel. The mount includes a first portion, a second portion, and a third portion. The first portion is configured to be attached to a rear face of the front panel. The first portion extends in a first direction from the rear face of the front panel. The second portion extends from the first portion in a second direction that is different from the first direction. The third portion extends from the second portion in a third direction that is different from the second direction. The third portion includes a downward facing lip configured to engage a cavity formed in the mirror housing. In this manner, the front panel can be secured to the mirror housing.

Yet another example aspect of the present disclosure is directed to an illuminated vanity mirror. The illuminated vanity mirror includes a front panel having a front face and a rear face. The front face includes a reflective surface. Alternatively or additionally, a portion of the front face is at least partially transparent. In this manner, light can pass through the portion of the front face that is at least partially transparent. The illuminated vanity mirror includes a mirror housing and at least one light source positioned within the mirror housing. The at least one light source is configured to emit light through the portion of the front face that is at least partially transparent. The illuminated vanity mirror includes a first mount and a second mount. The first mount is attached to a first edge of the rear face of the front panel. The first mount includes a downward facing lip, and at least a portion of the downward facing lip is received in a cavity defined at an edge of the mirror housing. The second mount is attached to a second edge of the rear face of the front panel. The second mount is configured to lie adjacent to a second edge of the mirror assembly, and the second mount is configured to be secured to the mirror housing through one or more fasteners.

These and other features, aspects and advantages of various embodiments will become better understood with reference to the following description and appended claims. The accompanying drawings, which are incorporated in and constitute a part of this specification, depict embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an illuminated vanity mirror assembly having a front panel that is attachable to a mirror housing. The front panel can include a reflective surface. The front panel can include an illumination portion that is at least partially transparent. The mirror housing can house one or more light sources (e.g., light emitting diodes (LEDs)) that emit light through the illumination portion.

According to example embodiments of the present disclosure, the illuminated vanity mirror assembly can include a first mount. The first mount can be secured to a rear surface of the front panel. The first mount can include a downward facing lip. The downward facing lip can be configured to be engaged or retained into a cavity defined in the mirror housing (e.g., an edge member of the mirror housing). In this way, the front panel can be secured to the mirror housing when the downwardly facing lip of the first mount is positioned within the cavity.

In some embodiments, the illuminated vanity mirror can include a second mount. The second mount can be located, for instance, on a rear surface of the front panel (e.g., at an opposite edge to the mount with the downwardly facing lip). The second mount can abut an edge member of the mirror housing. The second mount can be secured to the mirror housing using one or more fasteners to provide additional stability in securing the front panel to the mirror housing.

In some embodiments, the downward facing lip of the first mount can include a first portion, a second portion, and a third portion. The first portion can extend in a first direction and can be secured to the rear surface of the front panel. The second portion can extend from the first portion in a second direction (e.g., a perpendicular direction away from the rear surface of the front panel). The third portion can extend from the second portion in a third direction. For instance, the third portion can extend from the second portion such that an angle is defined between the second portion and the third portion. More specifically, the angle can be an acute angle, a right angle, or an obtuse angle. In some embodiments, the third portion is the downward facing lip.

In some embodiments, the downward facing lip can extend a limited distance into the mirror housing when engaged with the cavity to reduce the impact (e.g., shadowing effects) on light emitted from one or more light sources in the mirror housing. For instance, the downward facing lip can extend less than about 1.5 inches into the mirror housing, such as less than about 0.75 inches into the mirror housing. As used herein, the use of the term "about" in conjunction with a numerical value is intended to refer to within 20% of the stated about.

Example aspects of the present disclosure are directed to an illuminated vanity mirror assembly allowing a front panel to be attached to a mirror housing. The front panel can include a reflective surface. The front panel can additionally include an illumination portion that is at least partially transparent. The mirror housing can house one or more light sources (e.g., light emitting diodes (LEDs)) that provide light through the illumination portion.

According to example embodiments of the present disclosure, the illuminated vanity mirror assembly can include at least one mount. The mount can be secured to a rear surface of the front panel. The mount can include a downward facing lip. The downward facing lip can be configured to be engaged or retained into a cavity defined in the mirror housing (e.g., an edge member of the mirror housing). In this way, the front panel can be secured to the mirror housing by simply engaging the downwardly facing lip with the cavity defined by the mirror housing.

In some embodiments, the illuminated vanity mirror can include an additional mount. The additional mount can be located, for instance, on a rear surface of the front panel (e.g., at an opposite edge to the mount with the downwardly facing lip). The additional mount can abut an edge member of the mirror housing. The additional mount can be secured to the mirror housing using one or more fasteners to provide additional stability in securing the front panel to the mirror housing.

In some embodiments, the mount having the downward facing lip can include three portions. A first portion can extend in a first direction and can be secured to the rear surface of the front panel. The second portion can extend from the first portion in a second direction (e.g., a perpendicular direction away from the rear surface of the front panel). A third portion can extend in a third direction downward from the second portion. For instance, the third portion can extend at an acute angle, perpendicular to, or at an obtuse angle with respect to the second portion. The third portion can be the downward facing lip.

In some embodiments, the downward facing lip can extend a limited distance into the mirror housing when engaged with the cavity to reduce the impact (e.g., shadowing effects) on light emitted from one or more light sources in the mirror housing. For instance, the downward facing lip can extend less than about 1.5 inches into the mirror housing, such as less than about 0.75 inches into the mirror housing. For instance, in some embodiments, the downward facing lip can extend a distance into the mirror housing that is less than about 50% of a depth of the mirror housing, such as less than about 30% of a depth of the mirror housing, such as less than about 20% of a depth of the mirror housing. As used herein, the use of the term "about" in conjunction with a numerical value is intended to refer to within 20% of the stated about.

Example aspects of the present disclosure provide a number of technical effects and benefits. For instance, in some embodiments, less precision for the angle of the brackets is required in order to secure the downward facing lip to the mirror housing. In that regard, less stringent manufacturing tolerances can be used, reducing manufacturing costs.

Moreover, instead of using four mounts, example embodiments can require fewer mounts, such as a single mount, or two mounts. Because fewer parts may be produced, the manufacturing costs of the assembly may be reduced. Furthermore, omitting at least two additional mounts may allow for more empty space inside the housing so that additional components may be included. By reducing the number of mounting surfaces within the mirror housing, the lighting may be improved as the mounting surfaces may be less likely to interfere with the light provided from the light source through the chamber and out through the illumination portion of the front panel.

Additionally, the alignment and mounting features can provide the necessary strength to support the weight of the mirror, and these features can support the weight of the mirror evenly. Further, servicing of components within the mirror housing may be quickly and easily accomplished.

Figure 1:
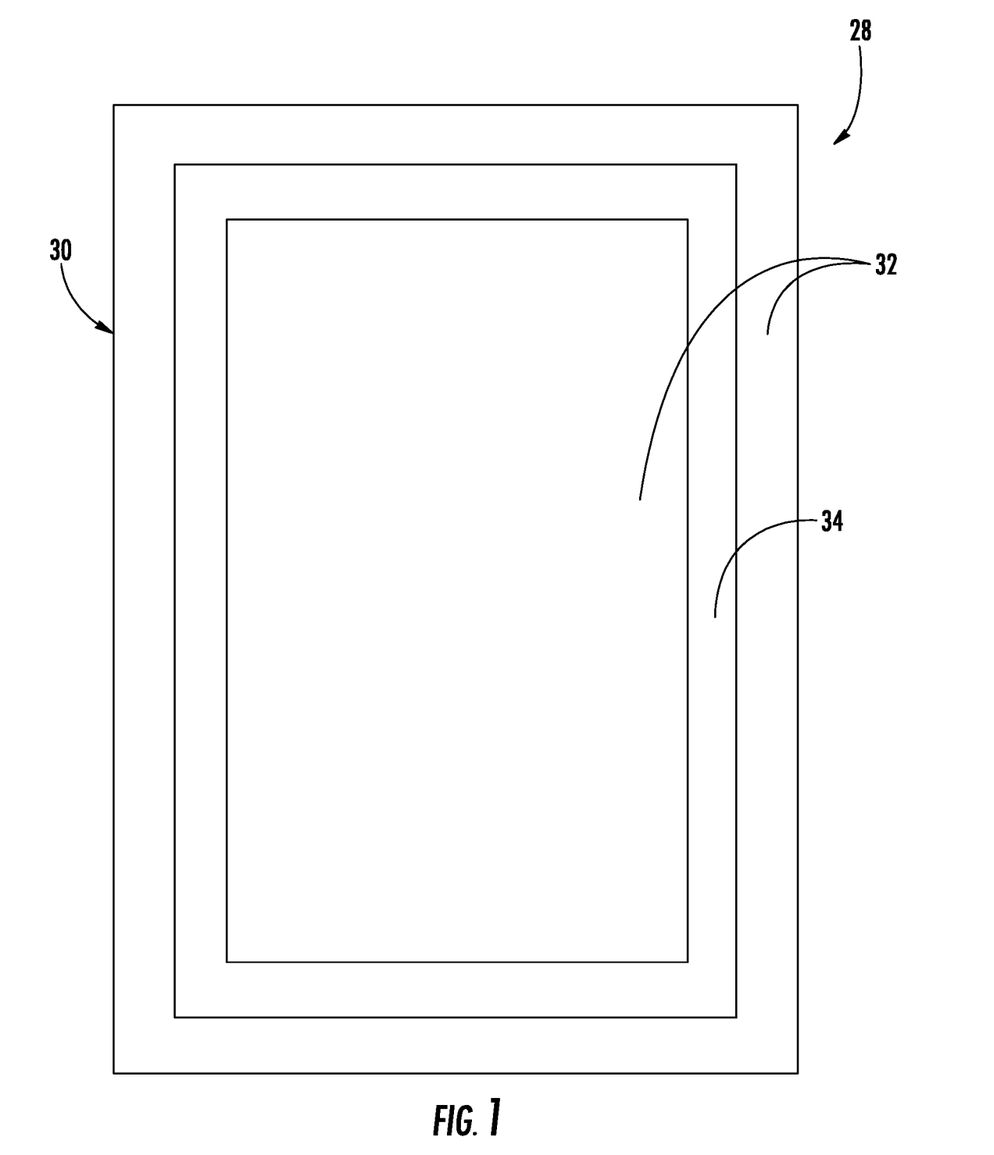
FIG. 1 depicts a front view of an illuminated vanity mirror assembly according to example embodiments of the present disclosure.
Figure 2:
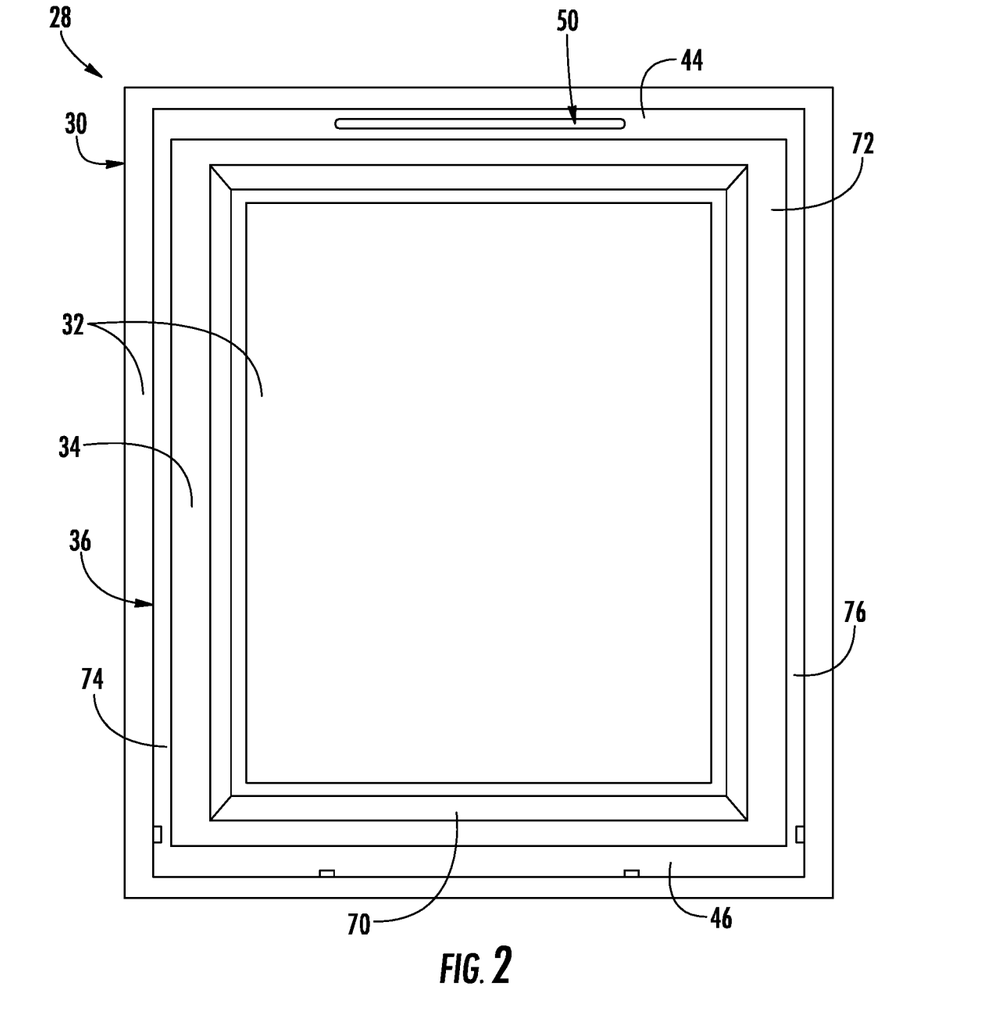
FIG. 2 depicts a front view of an illuminated vanity mirror assembly showing some interior components according to example embodiments of the present disclosure.

Referring now to the FIGS., FIG. 1 depicts a front view of one example embodiment of an illuminated vanity mirror assembly 28. FIG. 2 depicts a front view of the illuminated vanity mirror assembly 28 in which a front panel 30 of the illuminated vanity mirror assembly 28 has been made partially transparent so that a mirror housing 36 and other components positioned behind the front panel 30 may be seen. The front panel 30 includes one or more front reflective surface(s) 32 and one or more illumination portion(s) 34 that are at least partially transparent to light. The remainder of the assembly 28 is disposed behind the front panel 30.

Figure 3:
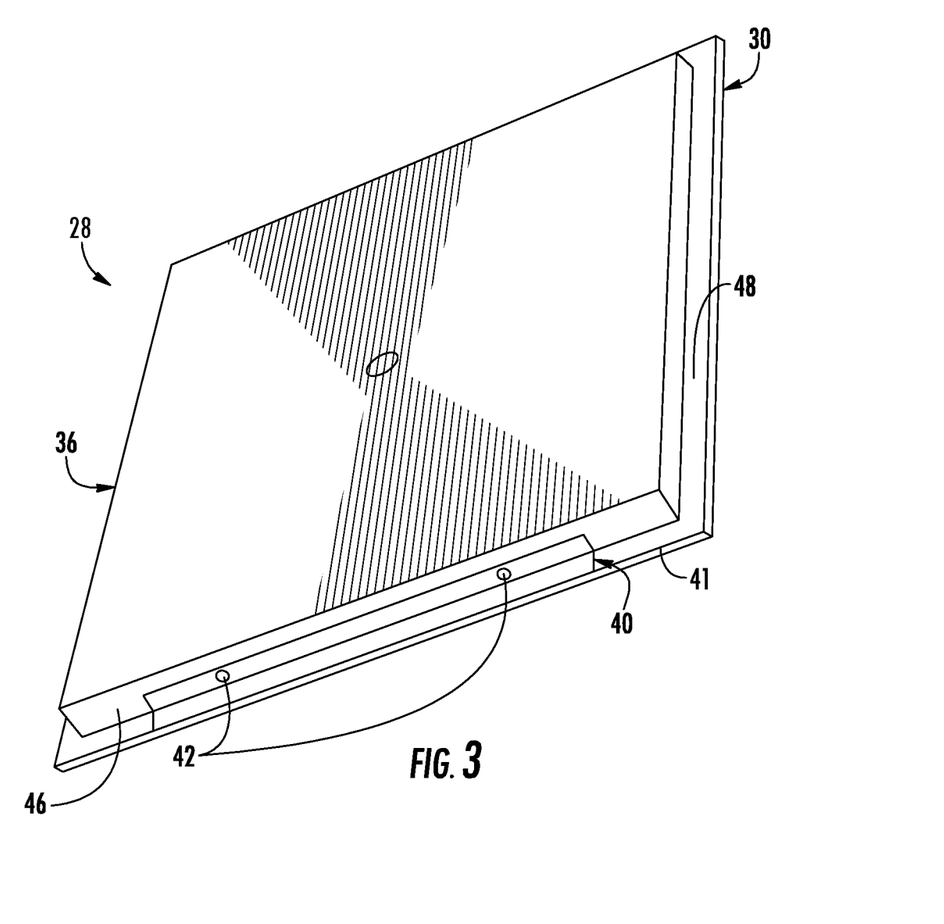
FIG. 3 depicts a perspective view of an embodiment showing the connection between a second mount and the bottom wall of the housing according to example embodiments of the present disclosure.

As shown in FIG. 2, the mirror housing 36 possesses an internal bracket 70. Together, the internal bracket 70 and walls 44, 46, 74, 76 of the mirror housing 36 collectively form a chamber 72. One or more light source(s) (not shown) may be disposed behind the front panel 30 and within the mirror housing 36 (FIGS. 2-3). The light source(s) may be placed in a location that allows light to shine into the chamber 72. Light from the light source(s) may travel through the chamber 72, behind the rear surface 48 of the front panel 30 to the rear surface of the front panel 30, and through the illumination portion(s) 34 so that the light can be seen when viewing the reflective front surface(s) of the illuminated vanity mirror assembly 28. In an example embodiment, the light source(s) can be light emitting diode (LED) light sources, but other light sources may be used as well.

When the front panel 30 is mounted to the mirror housing 36, the illumination portion(s) 34 of the front panel 30 may be positioned adjacent to the chamber 72 so that light from the light sources may pass through the at least partially transparent surface. The internal bracket 70 can preferably have a position and size so that the chamber 72 aligns properly with the illumination portion(s) 34 of the front panel 30. The area defined by the illumination portion(s) 34 can, in some embodiments, fit within the area defined by the chamber 72 so that light will disperse evenly through the transparent surface.

Figure 4:
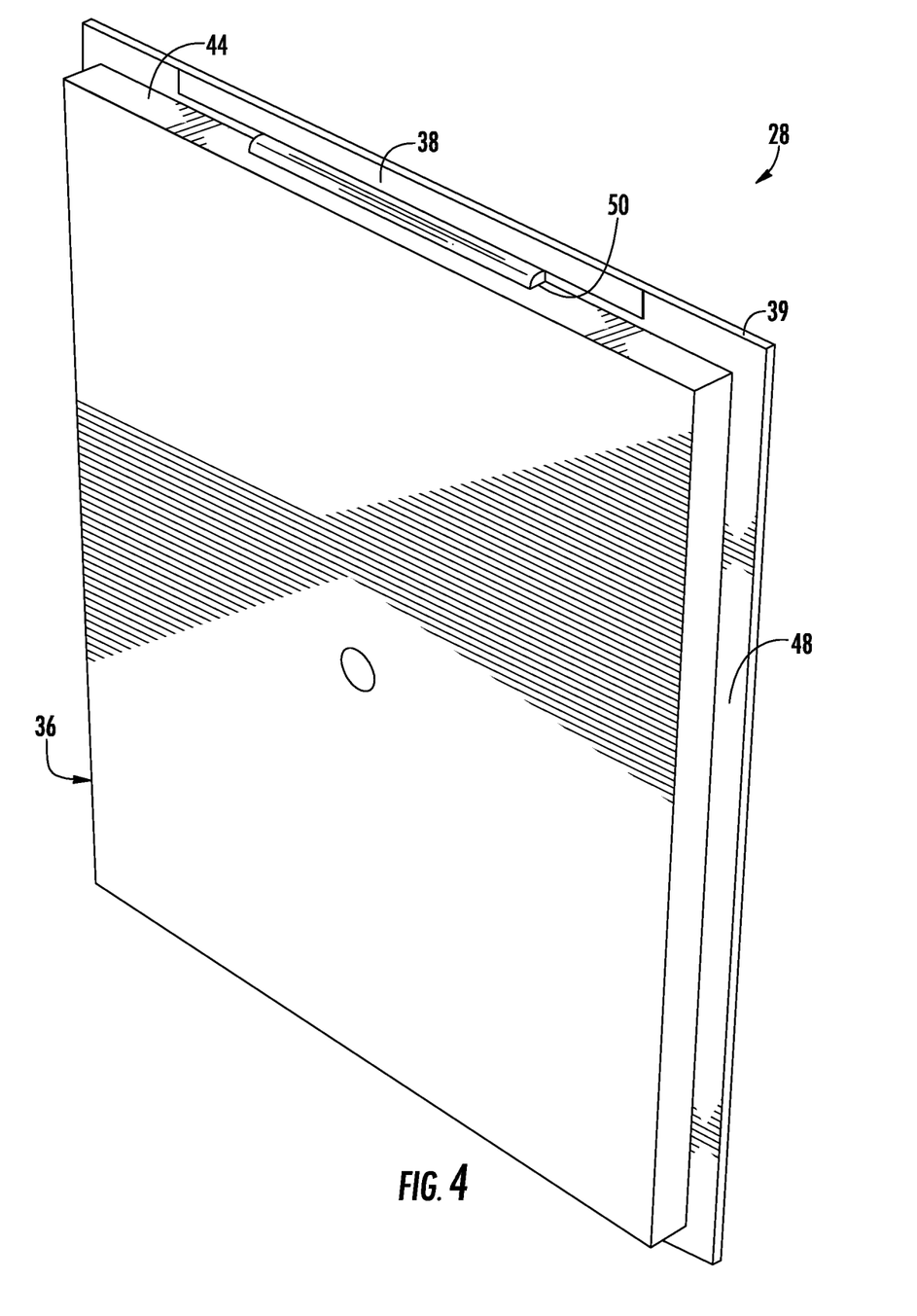
FIG. 4 depicts a perspective view of an embodiment showing the connection between a first mount and the top wall of the mirror housing according to example embodiments of the present disclosure.

FIG. 3 depicts a perspective view of one example embodiment of the illuminated vanity mirror assembly 28 where the bottom portion of the assembly 28 is visible. FIG. 4 depicts a perspective view of the same embodiment of the illuminated vanity mirror assembly 28 where a top portion of the assembly 28 is visible. These figures depict the front panel 30 and its connection with the mirror housing 36 according to example embodiments of the present disclosure. The mirror housing 36 can be attached to a wall, a desk or any other suitable surface.

A first mount 38 and a second mount 40 are attached to the rear surface 48 of the front panel 30. The first mount 38 is attached at or adjacent to a first edge 39 of the rear surface 48 of the front panel 30. The second mount 40 is attached at or adjacent to a second edge 41 (e.g., opposite edge) of the rear surface of the front panel. In the embodiment shown in FIGS. 3 and 4, the first edge 39 corresponds to a top edge of the rear surface 48 of the front panel 30, and the second edge 41 corresponds to a bottom edge of the rear surface 48 of the front panel 30. However, in other embodiments, the first edge 39 may correspond to the bottom edge of the rear surface 48 of the front panel 30, and the second edge 41 may correspond to the top edge of the rear surface 48 of the front panel 30. These attachments may be accomplished through a variety of ways, including, but not limited to, fasteners, adhesives, snap connections, or other connection methods. Alternatively, in some embodiments, the first and/or second mount(s) 38, 40 may be formed integrally with the rear surface 48 of the front panel 30.

The mirror housing 36 can possess a first wall 44 (e.g., a first edge member) and a second wall 46 (e.g., a second edge member). The first wall 44 and the second wall 46 can be located on a perimeter of the mirror housing 36. The first wall 44 and the second wall 46 can at least partially define a perimeter of the mirror housing 36. In the example embodiment shown FIGS. 3 and 4, the first wall 44 is a top wall of the mirror housing 36, and the second wall 46 is a bottom wall of the mirror housing 36. However, in other embodiments, the first wall 44 may be the bottom wall of the mirror housing 36, and the second wall 46 may be the top wall of the mirror housing 36.

Figure 5:
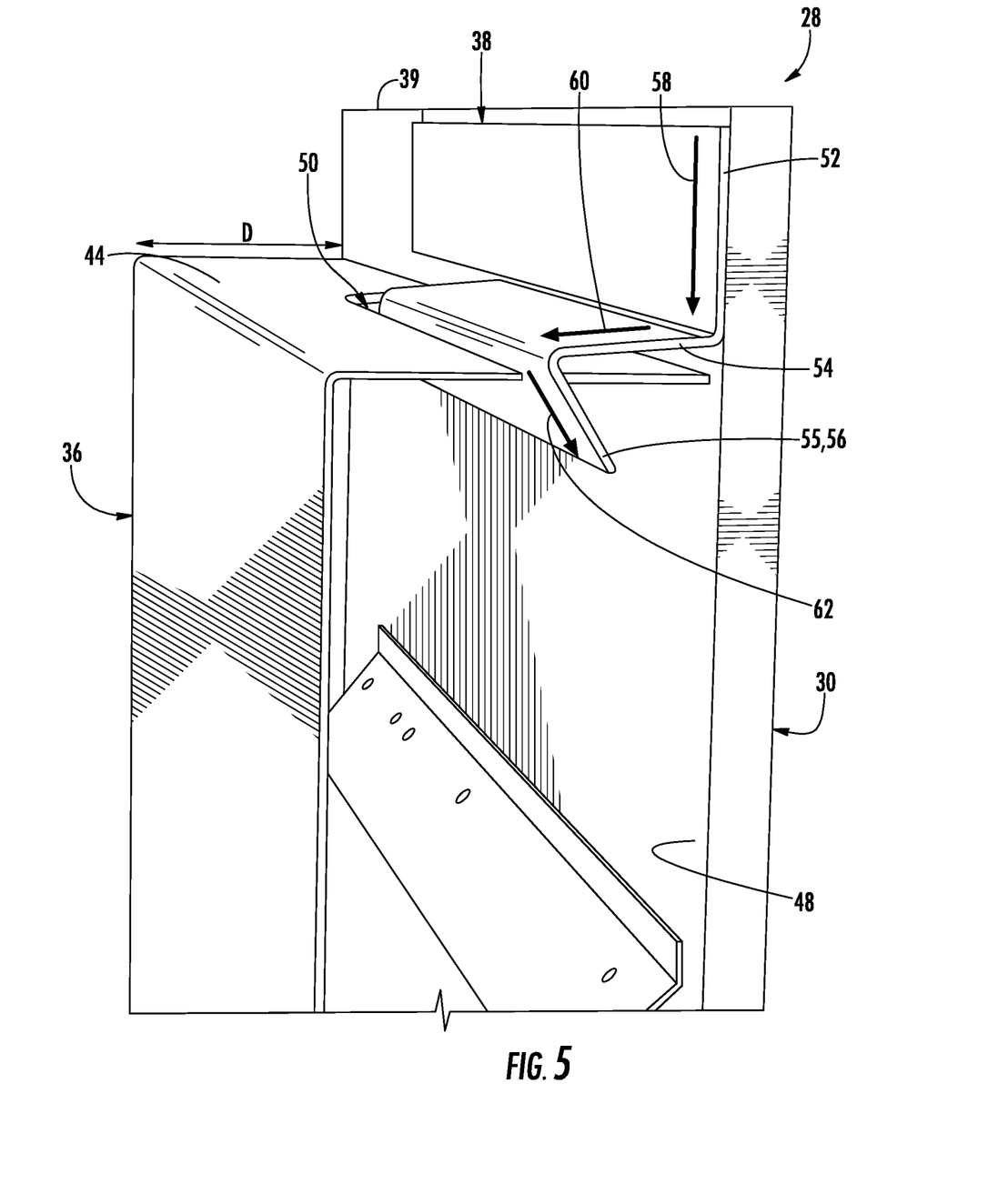
FIG. 5 depicts a perspective, cross-sectional view of an embodiment of the assembly showing the connection between the first mount and a top wall of the housing according to example embodiments of the present disclosure.

The first wall 44 can define a cavity 50 (e.g., recess, opening, through hole, etc.). A portion of the first mount 38 can be physically received within the cavity 50 defined by the first wall 44. In FIG. 5, a downward facing lip 55 on the first mount 38 is the portion that can be physically received within the cavity 50. In some embodiments, the cavity 50 can be of a size and shape that is sufficiently large so that a portion of the first mount 38 may be received within the cavity 50. However, the cavity 50 can be small enough to secure a portion of the first mount 38 in a fixed position. By securing the first mount 38, the attached front panel 30 may also be held in a fixed position or a relatively fixed position.

As shown in FIG. 3, the second wall 46 of the mirror housing 36 can abut the second mount 40. The second wall 46 can be connected or attached to the second mount 40. In FIG. 3, fasteners 42 are used to connect the second mount 40 to the second wall 46 of the mirror housing 36. In some embodiments, the fasteners 42 can be screws that extend through holes within the second mount 40 and the second wall 46. However, other fasteners may be used without deviating from the scope of the present disclosure, such as a snap connection, nuts and bolts, etc. In FIG. 3, two fasteners 42 are used, but more or fewer fasteners may be used.

In some embodiments, the fasteners 42 can be spaced evenly along the second mount 40, but the fasteners 42 may secure the second mount 40 and the second wall 46 at any location along the second mount 40. In an example embodiment, the mirror housing 36 will rest on top of the second mount 40 and the fasteners 42 will be applied to secure the mirror housing 36 and the second mount 40 together. However, in other embodiments, the second mount 40 may rest on top of the mirror housing 36 and one or more fastener(s) may be applied to secure mirror housing 36 and the second mount 40 together. In addition to or as an alternative to applying fasteners 42 to a second wall 46, fasteners may be applied to side walls or other surfaces of the mirror housing 36 to secure the front panel 30.

FIG. 5 depicts a perspective, cross-sectional view of the assembly so that the connection between the first mount 38 and the cavity 50 defined within the first wall 44 of the mirror housing 36 can be seen more clearly. The first mount 38 has a downward facing lip 55 that is received within the cavity 50.

In the embodiment shown in FIG. 5, the first mount 38 possesses a first portion 52, a second portion 54, and a third portion 56. The first portion 52 extends in a first direction 58 as indicated by the arrow in FIG. 5 and is attached to the rear surface 48 of the front panel 30. As shown in FIG. 5, this first direction 58 is vertically downward. The second portion 54 extends in a second direction 60 as indicated by the arrow in FIG. 5. This second direction 60 is different from the first direction 58. In the embodiment shown in FIG. 5, the second direction 60 is in a horizontal direction and is perpendicular to the plane created by the rear surface 48 of the front panel 30.

The third portion 56 extends downwardly in a third direction 62 as indicated by the arrow in FIG. 5. The third portion 56 may correspond to the downward facing lip 55. The third direction 62 is different from the second direction 60. In the embodiment shown in FIG. 5, the third direction 62 extends downwardly and back towards the rear surface 48 of the front panel 30. Thus, in the embodiment shown, the second portion 54 and third portion 56 form an acute angle.

Figure 6:
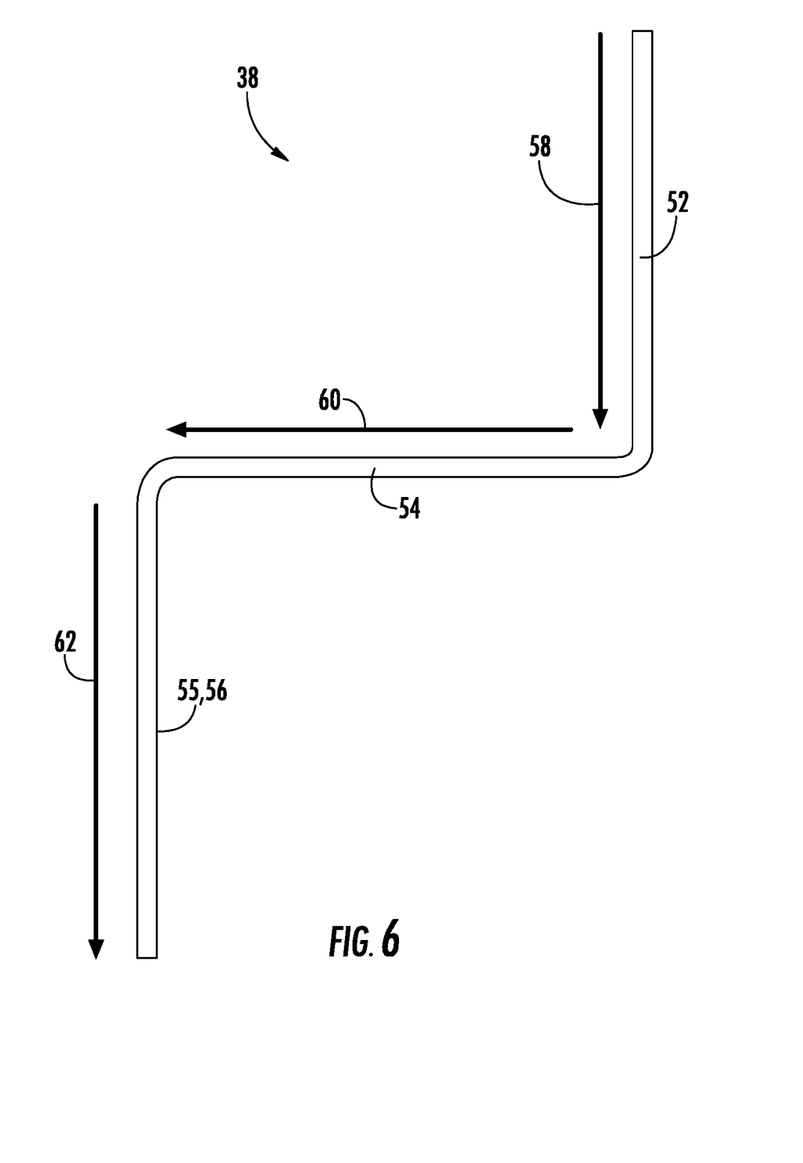
FIG. 6 depicts a cross-sectional view of an embodiment of a first mount according to example embodiments of the present disclosure.
Figure 7:
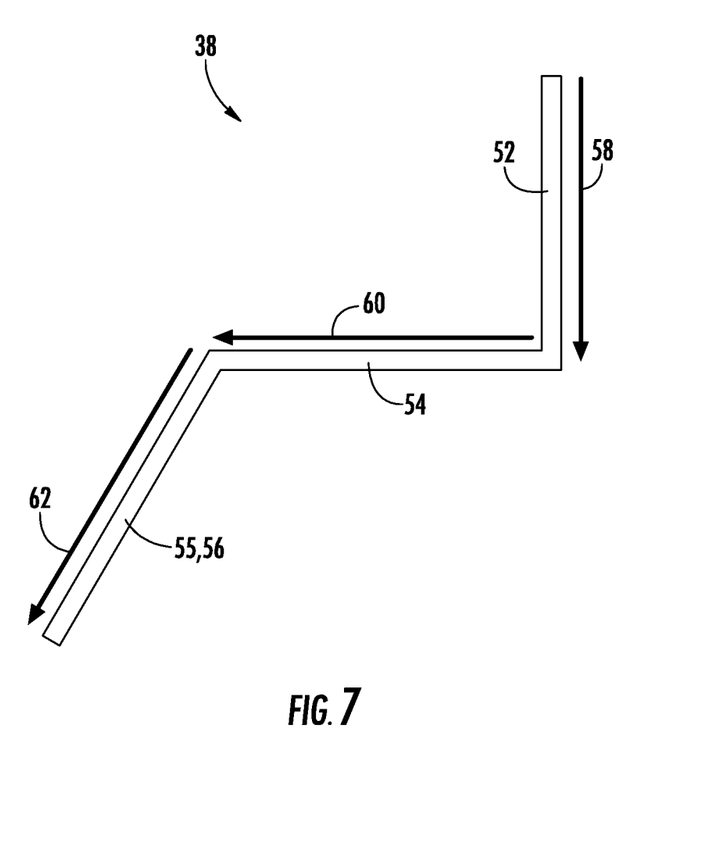
FIG. 7 depicts a cross-sectional view of an embodiment of a first mount according to example embodiments of the present disclosure.
Figure 8:
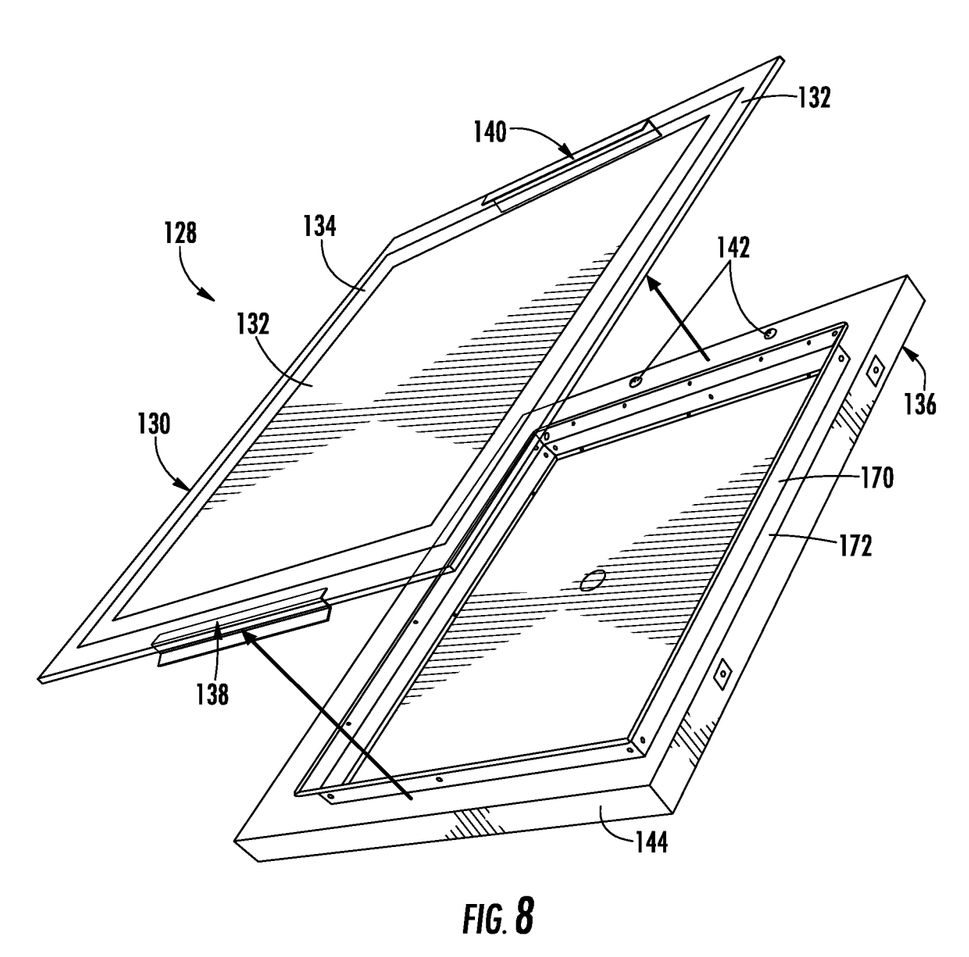
FIG. 8 depicts a perspective view of an embodiment showing the entire illuminated vanity mirror assembly according to example embodiments of the present disclosure.

In other embodiments, the third direction 62 can be such that second portion 54 and the third portion 56 form a right angle or an obtuse angle. For instance, as shown in FIG. 6 the third portion 56 extends perpendicularly from the second portion 54. As shown in FIG. 7, the third portion 56 extends at an obtuse angle relative to the second portion 54.

The first portion 52, the second portion 54, and the third portion 56 of the first mount 38 can be integrally formed. Alternatively, these portions of the first mount 38 may be discrete components that are attached together.

As shown in FIGS. 3-5, the first mount 38 can extend through the cavity 50 of the first wall 44 and may extend into the mirror housing 36. Some portion of the first mount 38 may extend into the chamber 72 where light shines from the light sources and exits through the illumination portion(s) 34 of the front panel 30. However, preferably only a small amount or portion of the first mount will extend into this chamber to avoid interference with the lighting.

For instance, the mirror housing 36 can have a depth D. The first mount 38 may extend a distance that is no more than about 50% of the depth of the mirror housing, such as no more than about 30% of the depth of the mirror housing, such as no more than about 20% of the depth of the mirror housing.

In one example embodiment, the first mount 38 will not extend further than about 1.5 inches into the mirror housing 36. In another example embodiment, the first mount 38 will not extend further than about 0.75 inches into the mirror housing 36.

In the embodiments shown in FIG. 5-7, the first mount 38 possesses a first portion 52, a second portion 54, and a third portion 56. However in other embodiments, the first mount may include only two portions or it may include more than three portions.

FIGS. 8-11 depict another example embodiment of the present disclosure where a first mount is received within a cavity that is defined by the bottom wall of a mirror housing. In this example embodiment, a front panel 130 is attached to a mirror housing 136 to form the overall illuminated vanity mirror assembly 128. A first mount 138 and a second mount 140 are attached to a rear surface 148 of the front panel 130. The first mount 138 is attached at or adjacent to a first edge 139 of the rear surface 148 of the front panel 130 and the second mount 140 is attached at or adjacent to a second edge 141 of the rear surface 148 of the front panel 130.

Figure 9:
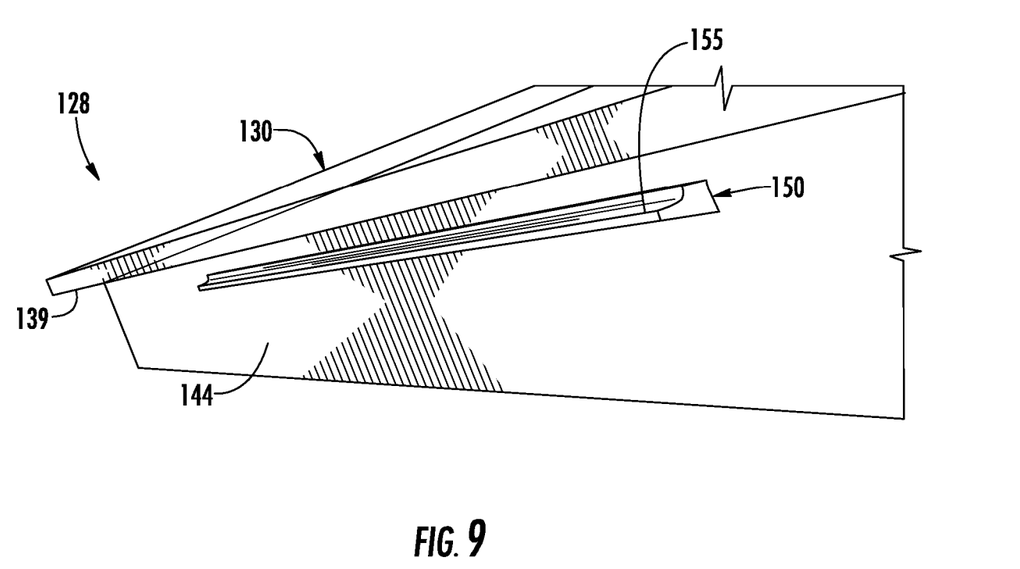
FIG. 9 depicts a perspective view of an embodiment of the assembly showing the first mount being received within a cavity defined within the bottom wall of the housing according to example embodiments of the present disclosure.
Figure 10:
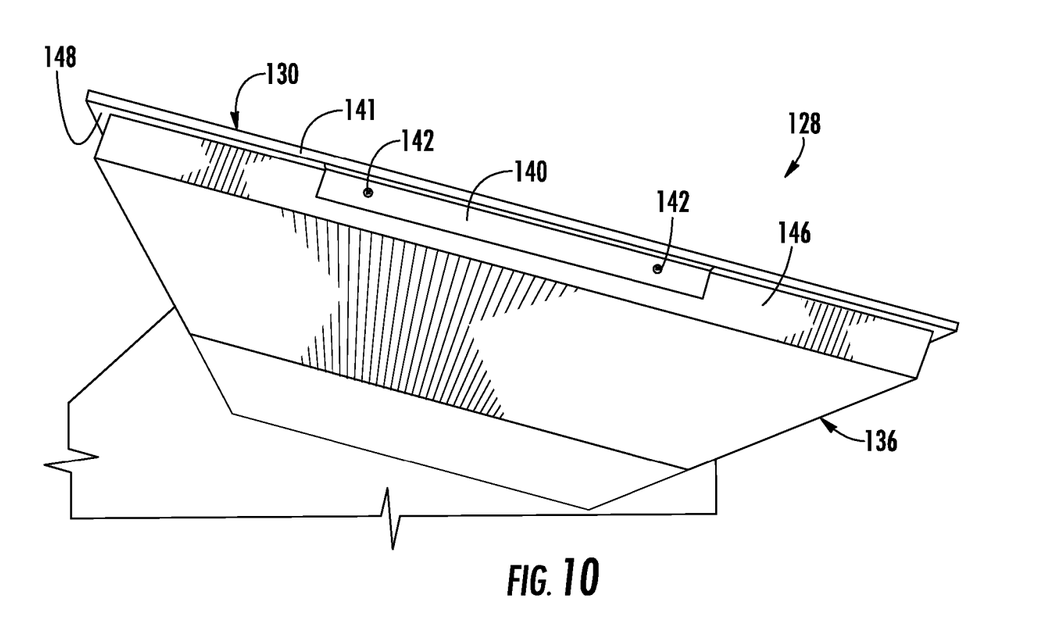
FIG. 10 depicts a perspective view of an embodiment of the assembly showing the second mount and its connection with the top wall of the housing according to example embodiments of the present disclosure.
Figure 11:
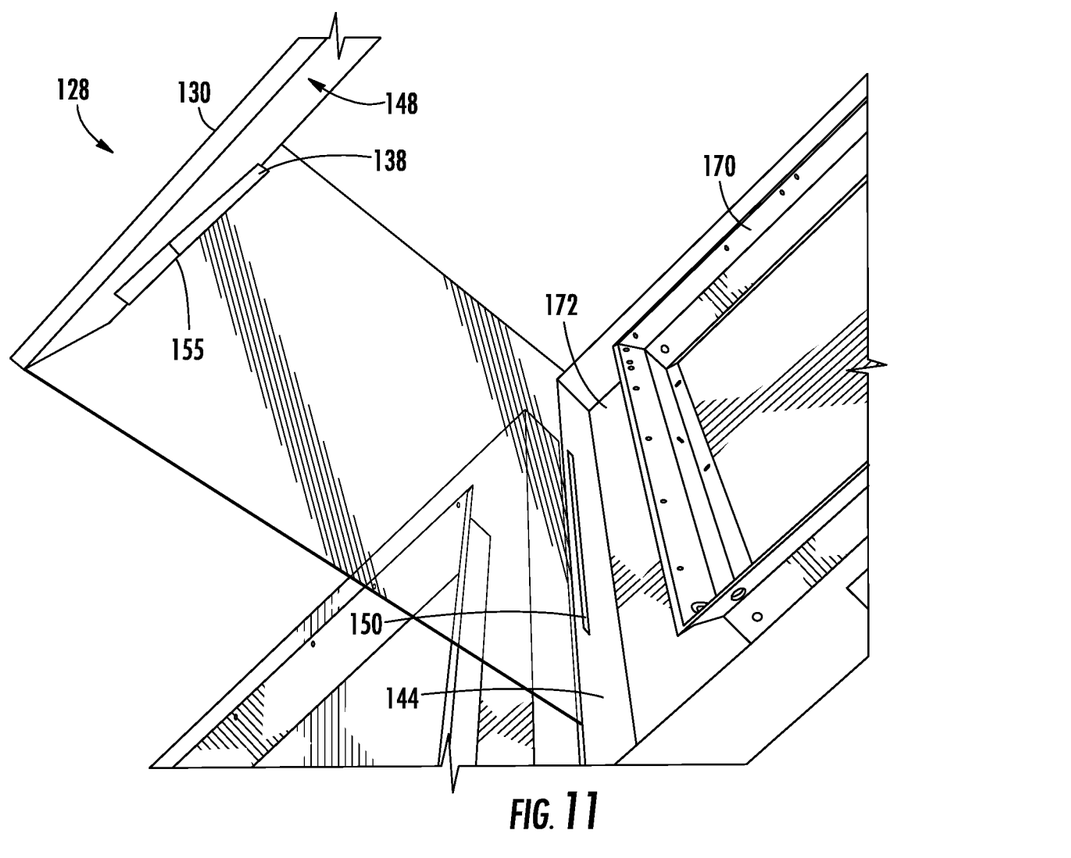
FIG. 11 depicts a perspective view of an embodiment where the front panel is removed and offset from the mirror housing so that the cavity and the first mount may be seen according to example embodiments of the present disclosure.

In the embodiment shown in FIGS. 9 and 10, the first edge 139 corresponds to a bottom edge of the rear surface 148 of the front panel 130 and the second edge 141 corresponds to a top edge. However, in other embodiments, the first edge 139 may correspond to a top edge of the rear surface 148 of the front panel 130 and the second edge 141 may correspond to a bottom edge. These attachments may be accomplished through a variety of ways, including, but not limited to, fasteners, adhesives, snap connections, etc. Alternatively, the first and/or second mount(s) 138, 140 may be formed integrally with the rear surface 148 of the front panel 130.

The mirror housing 136 can include a first wall 144 and a second wall 146. In FIGS. 9 and 10, the first wall 144 can be a bottom wall of the mirror housing 136, and the second wall 146 can be a top wall of the mirror housing 136. However, in other example embodiments, the first wall 144 may be the top wall of the mirror housing 136, and the second wall 146 may be the bottom wall of the mirror housing 136.

The first wall 144 can define a cavity 150. A portion of the first mount 138 can be physically received within the cavity 150. In FIG. 9, a downward facing lip 155 of the first mount 138 is the portion that is physically received within the cavity 150. In some embodiments, the cavity 150 can accommodate a portion of the first mount 138. In this manner, the portion of the first mount 138 can be secured in a fixed position via the cavity 150. By securing the first mount 138 via the cavity 150, the attached front panel 130 may also be held in a fixed position or a relatively fixed position.

As shown in FIG. 10, the second wall 146 of the mirror housing 136 may be connected or attached to the second mount 140. In FIG. 10, fasteners 142 are used to secure the second mount 140 to the second wall 146 of the mirror housing 136. The fasteners 142 in FIG. 10 are screws that extend through holes within the second mount 140 and the second wall 146. However, other connection methods can be used without deviating from the scope of the present disclosure, such as a snap connection, nuts and bolts, etc. In FIG. 10, two fasteners 142 are used, but more or fewer fasteners may be used. In some embodiments, the fasteners 142 can be spaced evenly along the second mount 140. However, the fasteners 142 may secure the second mount and the second wall 146 at any location along the second mount 140. In addition to or as an alternative to applying fasteners 142 to a second wall 146, fasteners 142 may be applied to side walls or other surfaces of the mirror housing 136 to secure the front panel 130.

Figure 12:
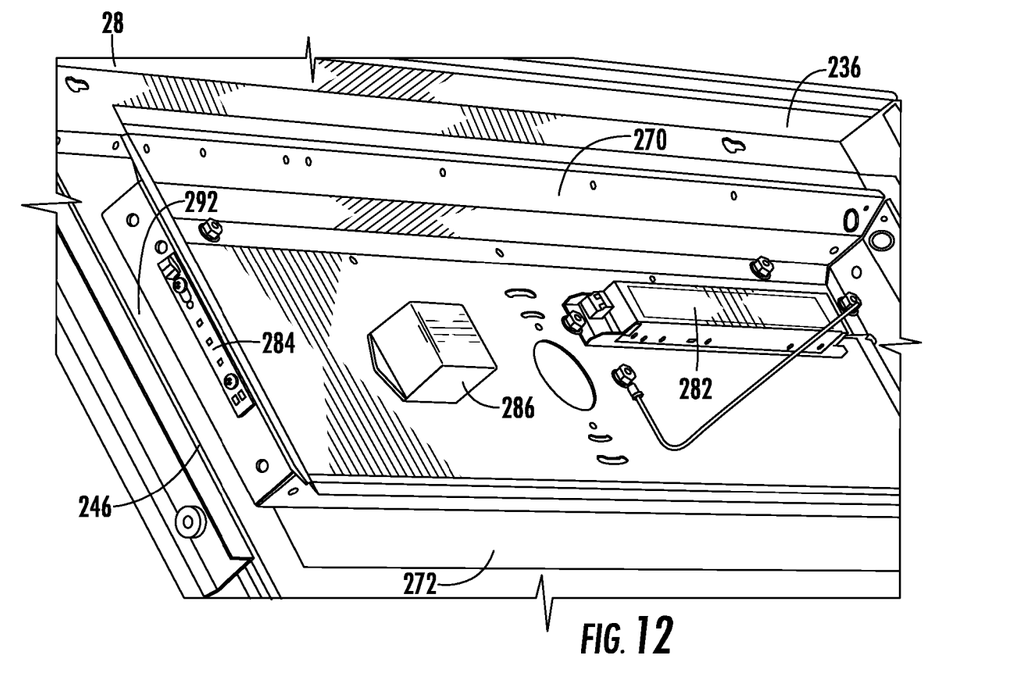
FIG. 12 depicts a perspective view of one or more light sources disposed within the mirror housing according to example embodiments of the present disclosure.
Figure 13:
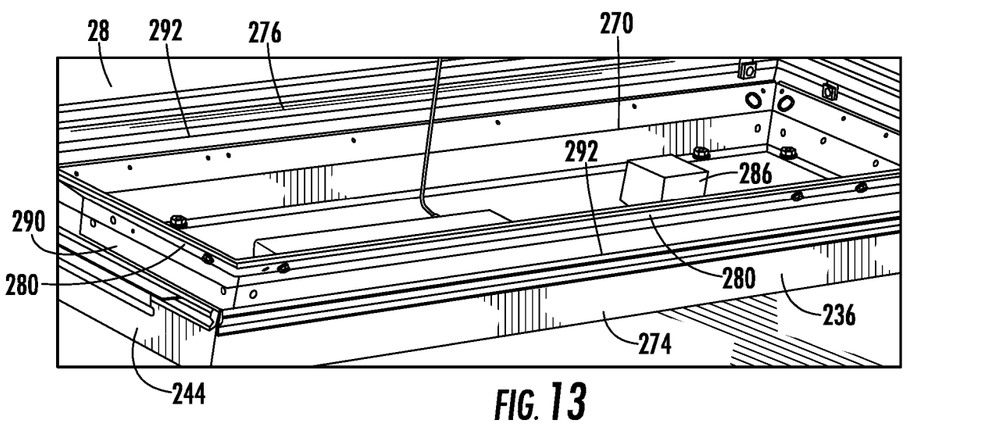
FIG. 13 depicts another perspective view of one or more light sources disposed within the mirror housing according to example embodiments of the present disclosure

In the embodiment shown in FIGS. 12 and 13, the one or more light source(s) include a first light source 280 and a second light source 284. For instance, the first light source 280 can be controlled by a first driver 282 and the second light source 284 can be controlled by a second driver 286. The first driver 282 and second driver 286 can be configured to illuminate the first light source 280 and second light source 284 independently and/or coincidentally. For example, the first driver 282 and second driver 286 can be controlled independently so that only the first light source 280 is illuminated, only the second light source 284 is illuminated, and/or coincidentally so that both and/or neither the first light source 280 and/nor the second light source 284 are illuminated.

For instance, the first light source 280 can be positioned to illuminate a first portion 290 of the chamber 272. For example, the first light source 280 can be positioned along an internal bracket 270 to illuminate a first portion 290 of the chamber 272. The second light source 284 can be positioned to illuminate a second portion 292 of the chamber 272. For example, the second light source can be positioned along the internal bracket 270 to illuminate the second portion 292 of the chamber 272. The first light source 280 and/or the second light source 284 can additionally or alternatively be positioned along one or more other suitable surfaces within a mirror housing 236, such as walls 244, 246, 274, 276 and/or a back of the mirror housing 236. The first portion 290 and second portion 292 may be distinct portions and/or may overlap. For example, the first portion 290 may be a portion adjacent to a first wall 244, a third wall 274, and a fourth wall 276 and the second portion 292 may be a portion adjacent to a second wall 246. For example, the first light source 280 may be positioned along the portions of the internal bracket 270 that are parallel to the first, third, and fourth walls 244, 274, 276 and the second light source 284 may be positioned along the portion of the internal bracket 270 that is parallel to the second wall 246. Thus, illuminating the second light source independently can illuminate the illumination portion 34 adjacent to the second wall 246 and illuminating the first and second light sources 280, 284 coincidentally can illuminate the entire illumination portion 34.

As another example, the first portion 290 may comprise the entire chamber 272 and the second portion 292 may comprise a portion of the chamber 272 that is also part of the first portion 290. For example, the first light source 280 may be positioned around most of or the entire internal bracket 270 to illuminate most of or the entire illumination portion 34 without requiring the second light source 284 to be illuminated coincidentally. The second light source 284 can then be positioned along a portion of the internal bracket 270 that includes some of or the entire first light source 280. For example, the second light source 284 can be positioned closer to and/or farther from the illumination portion 34 than the first light source 280. As another example, the second light source 284 can be positioned at a similar distance from the illumination portion as the first light source 280 and be integrated into a same structure as the first light source 280. For example, a string of LEDs comprising LEDs connected to the first driver 282 and LEDs connected to the second driver 286 can be attached to the portion of the internal bracket 270 that includes the first and second light sources 280, 284.

The second light source 284 can be illuminated independently to provide a lower light level on one or more reflective surface(s) 32 than when the first light source 280 is illuminated independently or coincidentally with the second light source 284. For example, the second light source 284 can be illuminated in a nighttime operating mode or low-light operating mode. For instance, the lower light level can be more aesthetically and/or functionally pleasing to an individual using the illuminated vanity mirror assembly 28. For example, the first and second light sources 280, 284 can be controlled using switches, such as separate light switches or a main switch and/or auxiliary switches. As another example, the first and second drivers 282, 286 can be connected to a control system configured to control illumination of the first and second light sources 280, 284. For example, the control system can illuminate the second light source 284 independently in response to a signal from a clock (e.g. indicating a nighttime hour), light sensor (e.g. indicating low levels of ambient light), or other suitable sensor, or combination thereof.

In the example embodiments shown, the front panel 30, 130 possesses a rectangular shape. Other components of the assembly such as the first and second mount, the illumination surface(s) 34, 134 of the front panel, and the internal bracket 70, 170 of the mirror housing 36, 136 are modified to accommodate this shape. This embodiment allows light to shine along the perimeter of the front panel so that the light shines evenly when someone looks into the central reflective surface 32, 132. However in other embodiments, the front panel 30, 130 may possess a circular shape, an oval shape, a polygon shape or any other shape. Accordingly other components and the assembly may be altered to accommodate the shape of the front panel. For example, if a circular front panel were used, then a circular internal bracket and a circular illumination portion on the front panel could be used. However, the illumination portion may have any shape and does not have to be formed around the perimeter of the front panel.

While the present subject matter has been described in detail with respect to specific example embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An illuminated vanity mirror assembly, comprising:
    a front panel comprising a front face and a rear face, the front face comprising a reflective surface;
    a mirror housing defining a chamber;
    at least one light source positioned within the mirror housing such that the at least one light source emits light into the chamber; and
    a mount attached to the rear face of the front panel, the mount configured to secure the front panel to the mirror housing,
    wherein when the front panel is secured to the mirror housing via the mount, a downward facing lip of the mount extends into the chamber via an opening defined by an exterior surface of the mirror housing.

2. The illuminated vanity mirror assembly of claim 1, wherein the mount is attached to the rear face of the front panel at or adjacent to an edge of the rear face of the front panel.

3. The illuminated vanity mirror assembly of claim 1, wherein the downward facing lip extends no more than about 1.5 inches into the chamber.

4. The illuminated vanity mirror assembly of claim 1, wherein the downward facing lip extends no more than about 0.75 inches into the chamber.

5. The illuminated vanity mirror assembly of claim 1, wherein the mount comprises:
   a first portion extending in a first direction, the first portion being attached to the rear face of the front panel;
   a second portion extending from the first portion in a second direction that is different from the first direction; and
   a third portion extending from the second portion downwardly in a third direction that is different from the second direction, the third portion comprising the downward facing lip.

6. The illuminated vanity mirror assembly of claim 5, wherein the second direction is perpendicular to the first direction.

7. The illuminated vanity mirror assembly of claim 5, wherein the third portion extends from the second portion such that an acute angle is defined between the second portion and the third portion.

8. The illuminated vanity mirror assembly of claim 5, wherein the third direction is perpendicular to the second direction.

9. The illuminated vanity mirror assembly of claim 5, wherein the third portion extends from the second portion such that an obtuse angle is defined between the second portion and the third portion.

10. The illuminated vanity mirror assembly of claim 5, wherein the first portion, second portion, and third portion are integrally formed with one another.

11. The illuminated vanity mirror assembly of claim 1, wherein the mirror housing includes a rear wall, a top wall, a bottom wall, and a pair of side walls.

12. The illuminated vanity mirror assembly of claim 11, wherein the mount extends into the chamber through the top wall.

13. A mount for securing a front panel of an illuminated vanity mirror to a mirror housing configured to secure the illuminated vanity mirror to a surface and house one or more lighting sources configured to provide light through at least a portion of the front panel, the mount comprising:
   a first portion extending in a first direction, the first portion configured to be attached to a rear face of the front panel;
   a second portion extending from the first portion in a second direction that is different from the first direction and non-planar to the first portion; and
   a third portion extending from the second portion in a third direction that is different from the second direction and non-planar to the second portion, the third portion comprising a downward facing lip;
   wherein when the front panel is secured to the mirror housing via the mount, the downward facing lip of the mount extends into a chamber defined by the mirror housing via an opening defined by an exterior surface of the mirror housing.

14. The mount of claim 13, wherein the third portion extends from the second portion such that an acute angle is defined between the second portion and the third portion.

15. The mount of claim 13, wherein the third direction is perpendicular to the second direction.

16. The mount of claim 13, wherein the third portion extends from the second portion such that an obtuse angle is defined between the second portion and the third portion.

17. An illuminated vanity mirror assembly, comprising:
   a front panel comprising a front face and a rear face, the front face comprising a reflective surface, the front face having an illumination portion that is at least partially transparent;
   a mirror housing defining a chamber;
   at least one light source positioned within the mirror housing, the at least one light source configured to emit light through the illumination portion and into the chamber; and
   a first mount attached to the rear face of the front panel, the first mount having a downward facing lip; and
   a second mount attached to the rear face of the front panel via one or more fasteners,
   wherein when the front panel is secured to the mirror housing via the first mount and the second mount, the downward facing lip of the first mount extends into the chamber via an opening defined by an exterior surface of the mirror housing.

18. The illuminated vanity mirror assembly of claim 17, wherein the first mount comprises:
   a first portion extending in a first direction, the first portion being attached to the rear face of the front panel;
   a second portion extending from the first portion in a second direction that is different from the first direction; and
   a third portion extending from the second portion downwardly in a third direction that is different from the second direction, wherein the third portion comprises the downward facing lip.

19. The illuminated vanity mirror assembly of claim 17, wherein the mirror housing includes a rear wall, a top wall, a bottom wall, and a pair of side walls.

20. The illuminated vanity mirror assembly of claim 19, wherein the mount extends into the chamber through the top wall.

* * * * *